Figure 1:
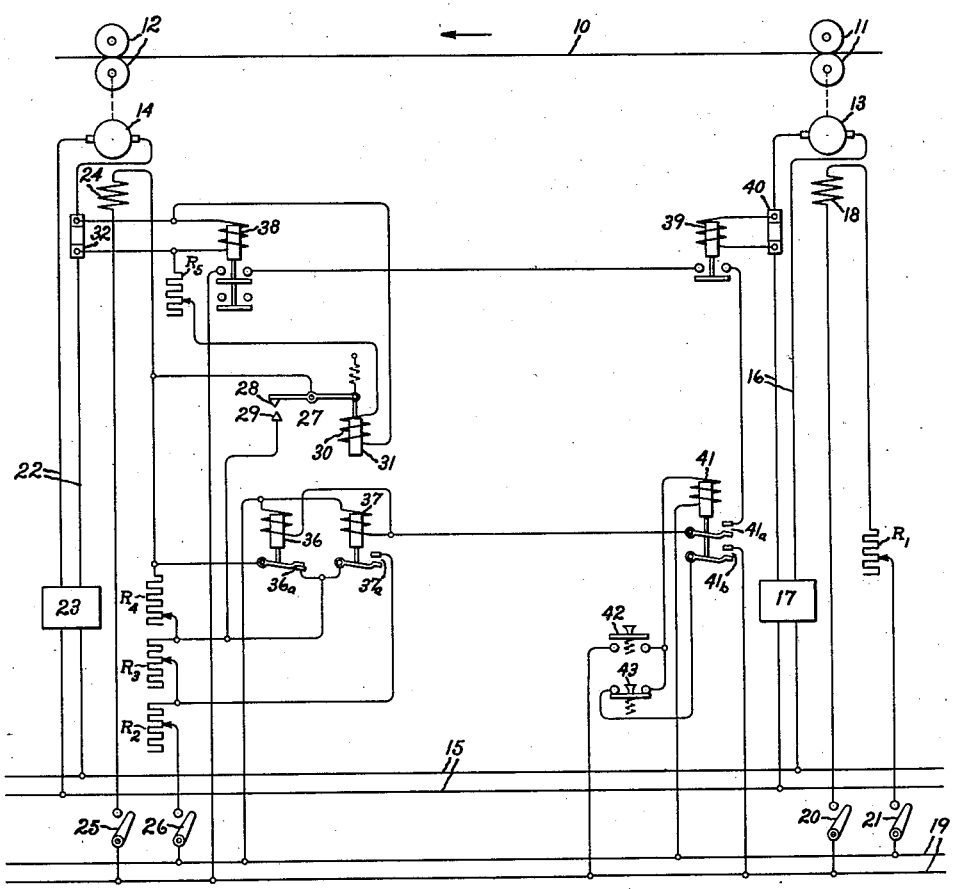

Jan. 22, 1935.  H. A. WINNE  1,988,930
COLD STRIP ROLLING MILL
Filed March 6, 1931   2 Sheets-Sheet 1

Inventor:
Harry A. Winne,
by Charles E. Tullar
His Attorney.

Jan. 22, 1935.  H. A. WINNE  1,988,930
COLD STRIP ROLLING MILL
Filed March 6, 1931   2 Sheets-Sheet 2

Inventor:
Harry A. Winne,
by Charles E. Tullar
His Attorney.

Patented Jan. 22, 1935

1,988,930

UNITED STATES PATENT OFFICE 1,988,930

COLD STRIP ROLLING MILL

Harry A. Winne, Schenectady, N. Y., assignor to General Electric Company, a corporation of New York Application March 6, 1931, Serial No. 520,616

9 Claims. (Cl. 80—35)

This invention relates to rolling mill drives, more particularly to cold strip rolling mills in which a plurality of tandem disposed sets of rolls are driven by electric motors, and it has for an object the provision of a simple, reliable and efficient system for automatically controlling the operation of the driving motors so as to maintain the tension of the strip substantially constant.

In carrying the invention into effect in one form thereof, I provide means for initially adjusting the speed of one of the driving motors for a predetermined rolling schedule and a device for controlling the motor so as to maintain substantially constant tension in the strip, together with means controlled by the load on the motors for rendering the tension controlling means effective and the initial speed adjusting means ineffective so that the regulating means will have control of the rolling operation and prevent buckling or stretching of the strip after initial speed adjustments of the respective stand motors.

More specifically a variable resistance is connected in the field circuit of one of the driving motors for initially adjusting the speed thereof for a predetermined rolling schedule and a regulating device serves to maintain substantially constant load on this motor so as to maintain a substantially constant tension on the strip, whilst a pair of contactors jointly controlled in accordance with the load on both motors serves to render the regulating device effective and the variable speed adjusting resistance ineffective when both motors are under load and to render the speed adjusting resistance effective and the regulating device ineffective when load on one of the motors fails.

In another aspect, my invention embraces a simple and efficient tension regulating system in which a pressure-responsive resistance connected in circuit with one of the motors serves to vary the speed thereof so as to maintain the tension on the strip substantially constant whilst a member movable in accordance with variations in the tension of the strip serves to actuate the pressure-responsive resistance.

In illustrating the invention in one form thereof, I have shown it as embodied in a system for controlling a cold strip rolling mill having but two sets or stands of rolls. It will be understood, however, that the invention may be and in practice usually is extended to mills having four or more stands of rolls, the connections and the apparatus located at the third and fourth and all succeeding stands being in all respects identical with that located at the second stand in the system shown.

Figure 2:
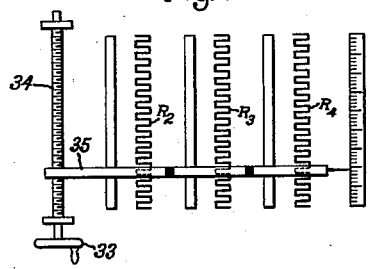
Figure 3:
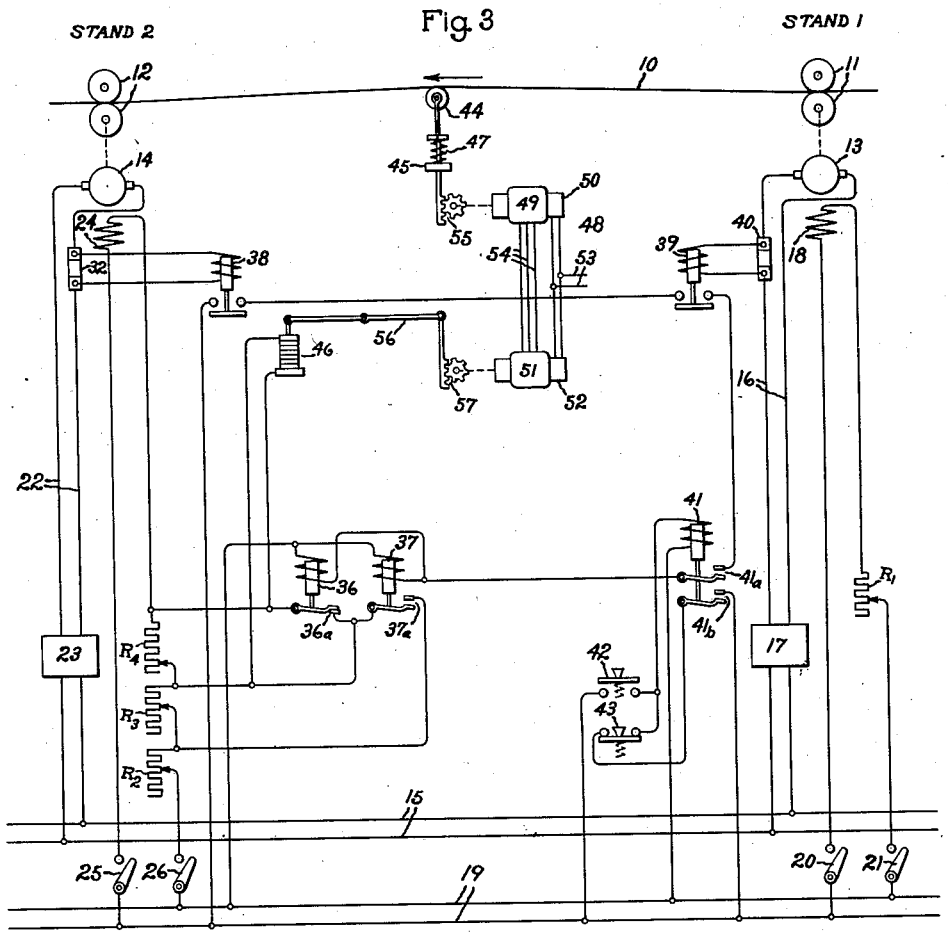

For a better and more complete understanding of the invention, reference should now be had to the following specification and to the accompanying drawings in which Fig. 1 is a simple, schematic, diagrammatical representation of a system embodying the invention; Fig. 2 is a detail, and Fig. 3 is a modification of the system of Fig. 1.

Referring now to Fig. 1 of the drawings, a strip of material 10, such for example as a strip of cold steel, passes in the direction of the arrow between the stand 1 comprising a pair of gauge-reducing rolls 11 and stand 2 comprising a pair of gauge-reducing rolls 12. The rolls 11 are driven by means of an electric motor 13, to the drive shaft of which they are connected by any suitable means, such for example as speed-reducing gears (not shown). In like manner the rolls 12 are driven by an electric motor 14 through suitable reducing gearing (not shown). As shown in the drawings, the set of rolls 11 and 12 are arranged in tandem, the gauge of the strip 10 being first reduced by the rolls 11 and subsequently further reduced by the rolls 12.

The electric motor 13 is shown as a direct current motor, the armature member of which is supplied with direct current power from any suitable source, such, for example, as that represented in the drawings by the two supply lines 15 to which it is connected by means of conductors 16, a suitable starting device 17 shown conventionally in the drawings being included in the circuit. Power for exciting the direct current field winding 18 of the motor is supplied from any suitable source of excitation, such as that represented by the exciting bus 19 with which connections are established by means of the manually operated switching devices 20, 21. A suitable variable resistance $R_1$ is connected in the circuit of the field winding 18 and this resistance serves to adjust the speed of the motor 13 to any desired value in a well-understood manner.

Likewise motor 14 is shown as of the direct current type and its armature member is supplied with power from the direct current source 15 to which it is connected by means of conductors 22, a suitable starting device 23 being included in the circuit. The field winding 24 of the motor 14 is excited from any suitable source of excitation, such for example as the excitation bus 19 with which it may be connected by means of the manually operated switching devices 25 and 26.

A suitable variable resistance device shown in the drawings as comprising the two resistance sections $R_2$, $R_3$ serves for initially adjusting the speed of the motor 14 to any desired rolling schedule.

The tension of the strip 10 is maintained substantially constant by means of a suitable regulating device shown in the drawings as comprising a vibratory contact device 27 and a resistance section $R_4$ connected in the circuit of the field winding 24, and controlled by the vibratory contact device 27. The vibratory contact device 27 is provided with a movable contact 28 which is connected to one terminal of the variable regulating resistance $R_4$ and a stationary contact 29 which is connected to the opposite terminal of the regulated resistance $R_4$, together with an actuating coil 30 and a movable core member 31 controlled thereby and which serves to effect the rapid opening and closing of the contacts 28 and 29 and the insertion in and exclusion of the resistance section $R_4$ from the circuit of the field winding 24 responsively to variations in the load on the motor 14, the actuating coil 30 being connected across a shunt 32 in the armature circuit of the motor so as to be responsive to variations in the load on the motor. Although not shown, it will of course be understood that the regulators may be provided with suitable anti-hunting means.

As shown in the drawings, the resistance sections $R_2$, $R_3$ and $R_4$ are connected in series relationship with each other in the circuit of the field winding 24 and as shown in Fig. 2 they are so arranged that they may be simultaneously and proportionally varied by rotation of the hand wheel 33 and the screw 34 connected thereto so that the contact arm 35 is moved either in an upwardly or a downwardly direction simultaneously to decrease or increase the values of the resistance sections $R_2$, $R_3$ and $R_4$ in the circuit, depending upon whether the hand wheel is rotated in a clockwise or a counter-clockwise direction. This arrangement of the resistances which has just been described, i. e., the arrangement of the resistance sections such that the regulating resistance $R_4$ across which the vibratory contacts 28, 29 are connected, is adjusted simultaneously with the variation of the initial speed adjusting resistors $R_2$, $R_3$ is desirable from the point of view of insuring equal speed of response of the regulator at any speed within the motor speed range. As is well understood by persons skilled in the art, the motor has a speed range by virtue of field control. When the motor is running at minimum speed, the insertion of only a small amount of resistance in the field circuit will raise its speed very appreciably and consequently at this point in the range the regulator should have control of only a small value of resistance. On the other hand, when the motor is adjusted to operate at maximum speed, there will be a large amount of external resistance in the circuit and to effect the same percentage change in speed the regulator should have control of a larger amount of resistance. By mechanically connecting the movable contacts by means of which the resistance sections $R_2$, $R_3$ and $R_4$ are varied, it will be obvious that the amount of resistance controlled by the regulator, i. e., the resistance section $R_4$, is adjusted simultaneously and proportionally with adjustments in the total external resistance in the field circuit, i. e., adjustments in the value of the resistance sections $R_2$, $R_3$.

In order that the tension of the strip 10 may be held substantially constant at any one of a plurality of desired values during the rolling operation, a variable resistance $R_5$ is included in the circuit of the actuating coil 30 of the vibratory regulating device 27. Assuming that the strip 10 is passing through the rolls 12 at the stand 2, a certain definite power or current input to motor 14 is required to do the actual work of driving the stand and reducing the gauge of the strip when there is no tension in the strip between the stands 2 and 1. Now if the current input required under this condition for the motor 2 be observed by means of an ammeter or any other suitable means and the rheostat $R_5$ be adjusted so that the regulator will hold a constant current input to the motor slightly above that required to merely drive the stand 2 and reduce the gauge of the strip 10, this excess power must be transmitted through the strip to stand 1 and the amount of tension in the strip will depend upon the amount of power transmitted through it. Consequently by varying the setting of the resistance section $R_5$, the tension in the strip 10 may be varied.

In order that the regulator 27 may be readily placed in or out of service as desired, i. e., the mill changed from non-regulating to regulating operation when the strip enters the rolls 12 and again changed from regulating to non-regulating when the tail-end of the strip leaves the rolls 11, two contactors 36 and 37 jointly controlled by the load relays 38, 39 are provided for controlling the resistance sections $R_4$, $R_3$ respectively, the contactor 36 being provided with normally closed contacts 36a for normally short circuiting the regulating resistance section $R_4$ and the contactor 37 being provided with normally open contacts 37a which serve to short circuit and exclude the initial speed-adjusting resistance section $R_3$ from the circuit of the field winding 24 when the regulator is placed in service. The actuating coil of the load relay 38 is connected across the terminals of the shunt 32 in the armature circuit of the motor 14 so as to be responsive to load on the motor 14 whilst the actuating coil of the load relay 39 is connected across the terminals of a shunt 40 in the armature circuit of the motor 13 so as to be responsive to load on the motor 13. A contactor 41 serves partially to complete an energizing circuit for the actuating coils of the contactors 36, 37 in response to momentary depression of the "regulating" push button 42 when it is desired for the mill to operate regulating. The contactor 41 is provided with a lower auxiliary contact 41b which serves to establish a holding circuit for the coil of the contactor 41 through the normally closed contacts of the "non-regulating" push button 43 when the contactor 41 is operated to its upper or closed position.

With the above understanding of the apparatus comprised in an embodiment of the invention and the manner in which the various elements are associated and connected to each other in the system, the operation of the system will readily be understood from the detailed description which follows: With no metal in the mill the motors 13, 14 as well as the motors for driving the succeeding stands are started up by first closing the field switches 20, 21, 25, 26, etc., and then operating the starting devices 17, 23, etc. The operator then adjusts the speed of the various stand driving motors to the values which have been calculated to be correct for the particular rolling schedule that is to follow. In adjusting the speeds of these motors, the operator may, of course, make use of tachometers (not shown) which may be provided at each stand to indicate the speed thereof. The speed of stand 1 is adjusted by means of the manually-operated rheostat $R_1$. Similarly the speed of stand 2 is adjusted by turning the hand wheel 33 which operates the rheostats $R_2$, $R_3$ and $R_4$. Since under this condition there is no metal in the mill, it is obvious that the load relays 39, 38 will not be sufficiently energized to close their contacts which consequently will remain open. Since the energizing circuits of the contactors 36, 37 include the normally-open contacts of the load relays 38, 39, these contactors will be in the position in which they are shown in the drawings, i. e., the normally-closed contacts 36a will short circuit the regulating resistance section $R_4$ and the contacts 37a of the contactor 37 will be open, thus inserting the initial speed adjusting resistance section $R_3$ in the circuit of the field winding 24 of the motor 14. Consequently the speed of motor 14 will be determined by the combined value of the resistance sections $R_2$ and $R_3$. The speeds of the motors which drive the succeeding stands of the mill (not shown) will be adjusted in a similar manner.

With the speeds of the motors for all the stands correctly adjusted to the desired rolling schedule, the operator will start the first strip through the rolls 11 of stand 1. When putting this first strip through, the "non-regulating" push button 43 should be depressed to place all the regulators of the mill out of service. The strip is carried along by the operator from stand 1 and threaded between the rolls 12 of stand 2 and so on through the rolls of the succeeding stands of the mill and then into the reel. As the strip enters between the rolls 12 of stand 2, the operator observes the current input required by the motor 14 by means of an ammeter (not shown) connected in the armature circuit of the motor 14 and then adjusts the regulating rheostat $R_5$ until the pointer and the dial (not shown) on this rheostat indicate that it is set for a current slightly higher than that shown on the ammeter. The same procedure is followed as the strip enters the rolls at the succeeding stands.

The operating then depresses the regulating button 42 to place the regulators in service. Depression of the regulating push button 42 establishes energizing circuits for the contactor 41, this circuit being traced from one side of the supply line 19 through the contacts of the push button 42, through the actuating coil of the contactor 41 and thence to the opposite side of the supply source 19. Contactor 41 in responding to the energization of its coil moves to the upper or closed position, the lower auxiliary contact 41b thereof establishing a holding circuit for the coil 41 through the normally-closed contacts of the non-regulating push button 43 independently of the regulating button 42 which may now be released. Contactor 41 in closing partially completes the energizing circuit of the contactors 36, 37, this circuit being traced from the upper side of the supply source 19 through the actuating coils of the contactors 36, 37 in parallel and then through the upper main contacts 41a of the contactor 41 as far as the normally-open contacts of the load relay 39.

As the operator enters the next strip into the rolls 11 of stand 1, the resulting load on motor 13 will cause the load relay 39 to be energized and to pick up and close its contacts, but this will have no effect on the regulator since the energizing circuit for the contactors 36, 37 passes through the open contacts of the load relay 38 which will still be deenergized and open and thus the regulator is held out of operation. The operator carries the strip along and inserts it into the rolls 12 of stand 2. As soon as the strip enters the rolls of the stand 2, the load on motor 14 causes the load relay 38 to pick up and close its contacts, thus completing the energizing circuit for the contactors 36 and 37 to the opposite side of the supply line 19 and as a result the contactor 36 opens its normally-closed contacts 36a to insert the regulating resistance section $R_4$ in the circuit of the field winding 24 whilst the contactor 37 closes its normally-open contact 37a to short circuit the initial speed adjusting resistance section $R_3$.

Since the strip 10 between the stands 1 and 2 is not yet under tension, the input to motor 14 will be below the load which the regulator is set to hold and consequently the vibratory contacts 28, 29 will be open, thus inserting the full amount of the regulating resistance section $R_4$ in the field circuit. This will, of course, cause the motor 14 which drives stand 2 to speed up and thus to take up the slack in the strip between the stands 2 and 1 and to place it under tension. As soon as the tension reaches the desired value, i. e., reaches a value such that the current input to the motor 14 reaches the value which the regulator is set to hold, the energization of the actuating coil 30 of the regulator will be sufficient to attract the core member 31 and thus to cause the movable contact member 28 to engage the stationary contact member 29 to place a short circuit about the regulating resistance section $R_4$. Persons skilled in the art will understand that these contacts 28 and 29 will open and close very rapidly, thus varying the effective value of the resistance in the field circuit so as to maintain constant current input to the motor 14 and as a result substantially constant tension in the strip 10 between the stands 2 and 1.

The purpose of the resistance section $R_3$ will best be understood by considering the operation that would ensue if this resistance section were omitted. If the resistance section $R_3$ were not included in the circuit of the field winding 24, the speed of motor 14 prior to the entry of the strip 10 into rolls 12 could only be adjusted by the resistance sections $R_2$. Then as soon as the strip entered stand 2, the regulator would be placed in service in the manner which has previously been described and therefore, the additional resistance due to the regulator, i. e., the resistance section $R_4$ would be inserted in the circuit of the field winding 24. Under this condition the speed while operating regulating would always have to be at least as high as that determined by the setting of the resistance section $R_2$ alone, for the most that the regulator 27 could do to reduce the speed of the motor would be to completely short circuit the resistance section $R_4$. Obviously it is perfectly possible that this speed might be so high as to rupture the strip 10. Actually a speed somewhat lower than that obtained when resistance section $R_2$ alone is in the circuit may be needed. Consequently by inserting resistance section $R_3$ and adjusting the non-regulating speed by means of resistance sections $R_2$ and $R_3$ together and then short circuiting resistance section $R_3$, when the regulator is placed in service, the regulator will always be able in case of necessity to decrease the speed of the motor below the value for which it was adjusted when running non-regulating. Obviously, the resistance sections $R_2$, $R_3$ and $R_4$ will have to be properly proportioned to accomplish the desired results.

When the tail end of the strip 10 leaves the rolls 11 of stand 1, it will be seen that if the regulator is not cut out of service that the motor 14 which drives the rolls 12 of stand 2 will immediately go to the top speed permitted by the regulator in an attempt to hold the current input to this motor constant. This undesirable result is prevented, however, by the load relay 39, which becomes deenergized and opens the energizing circuit of the contactors 36 and 37 when the load on motor 13 drops to the no-load value as the strip leaves the rolls 11. This immediately places the regulator 27 on stand 2 out of service by closing the contacts 36a to short circuit the regulating resistance section $R_4$ and opening the contacts 37a to insert the initial speed adjusting resistance section $R_3$ in the circuit of the field winding 24. Consequently the speed of the motor 14 will be maintained at the value to which it was adjusted by the operator previously to placing the regulator in service. Similarly as the strip leaves the rolls of stand 2, the load relay 38 will drop to its normal position and its lower set of contacts will place the regulator on the next succeeding stand out of service.

The modification shown in Fig. 3 of the drawings is in all respects identical with the system of Fig. 1 which has just been described in detail with the single exception of the tension regulating device. Consequently it is deemed unnecessary to repeat the description of those elements which are obviously identical and identically arranged with the corresponding elements of Fig. 1. The tension regulator shown in Fig. 3 comprises a suitable roller 44 and support 45 mounted between the stands 1 and 2 in such a manner that it will be movable in a vertical direction through a travel of a few inches. The pressure responsive or carbon pile resistance 46 is connected in parallel with the resistance section $R_4$, and an electrical motion transmitting and receiving system 48 actuates the pressure-responsive resistance 46 in response to vertical movement of the roller 44. Preferably the roller 44 is placed mid-way between the stands 1 and 2 and when the roller is at the top position of its vertical travel, its upper surface should be approximately six to eight inches above the line which the strip would normally occupy when stretched taut between the stands, if roller 44 were not present. When there is no strip in the mill, the roller 44 is actuated to the upper limit of its travel by an adjustable spring 47 or by any other suitable means, such, for example, as a system of levers and adjustable weights.

The electrical motion transmission system 48 comprises a motion transmitting device having a stator member 49 and a rotor member 50 and a motion-receiving device having a stator member 51 and a rotor member 52. The rotor members 50 and 52 of the motion transmitting and receiving devices are each provided with a single circuit field winding (not shown) which is supplied with alternating current from any suitable source, such, for example, as that represented in the drawings by the supply lines 53 to which these single circuit field windings are connected as indicated. The stator members 49 and 51 respectively of the motion transmitting and receiving devices are each provided with a distributed poly-circuit winding which is physically similar to a distributed three-phase winding, the winding of the stator member 49 and the winding of the stator member 51 being interconnected with each other by means of the three conductors 54 as shown. Persons skilled in the art will understand that the single circuit windings on the rotor members 50 and 52 of the transmitting and receiving devices respectively will induce voltages in the poly-circuit windings on the stator members 49 and 51, and that as long as the respective rotor windings are in angular agreement the voltages so induced in the respective stator windings will be equal and opposite and minimum current will flow in the stator windings and connections 54. However, if the rotor member 50 is moved with respect to stator member 49, the induced voltages in the stator windings of both transmitting and receiving device will become unbalanced and circulating currents will flow in both stator windings and connections 54, the magnitude of these circulating currents being proportional to the degree of angular displacement between the rotor members 50 and 52. These circulating currents will set up a torque between the rotor member 52 and stator member 51 of the receiving device and this torque will cause rotor member 52 to rotate, this rotation continuing until rotor member 52 is in angular agreement with rotor member 50, at which time the induced voltages in both stator windings will again be equal and opposite and the circulating currents will cease to flow. In other words, due to the voltages induced in the interconnected poly-circuit stator windings by the inductively related single circuit windings on the rotor members of the transmitting and receiving devices, rotation of the rotor member 50 of the transmitting device will cause the rotor member 52 of the receiving device to rotate through the same number of degrees and thus both rotor members will always remain in synchronism with each other.

In order that the vertical motion of the roller 44 in response to variations in the tension of the strip 10 can be made to vary the ohmic value of the pressure responsive regulating resistance 46, the shaft of the rotor member 50 is connected to the roller 44 by any suitable means, such, for example, as the rack and pinion 55, whilst the lever arm 56 which actuates the carbon pile resistance 46 is likewise connected to the rotor member 52 of the receiving device by means of the rack and pinion 57.

Obviously it is possible to mount the carbon pile regulating resistance on the support of the roller 44, but this would be extremely undesirable since the regulator would then be placed in a position in which it would be subject to mechanical damage. Therefore, the provision of the electrical motion transmitting system between the roller 44 and the regulating resistance 46 makes it possible to mount the regulating resistance 46 as well as the regulating resistances for the succeeding stands of the mill upon a common panel remote from any place of danger. This arrangement also facilitates the inspection and repair of the regulating device.

As previously pointed out, the carbon pile resistance 46 is not connected directly in series with the field winding of the motor which drives the stand 2, but on the contrary it is connected in parallel with the adjustable resistance section $R_4$. The purpose of having the carbon pile resistance shunted around the resistance $R_4$ rather than inserted in series in the field circuit of the motor is to provide means so that a given movement of the roller 44 will always produce approximately the same percentage change in the motor speed regardless of the speed at which the mill is adjusted to run. As is well understood in the art, a motor has a speed range by virtue of field control. When a motor is running at minimum speed, there will be required but a small amount of external resistance in the field circuit. It is obvious, therefore, that the insertion of only a small amount of resistance by the regulator would effect a considerable change in speed. On the other hand, when the motor is adjusted to operate at a maximum speed, there will be a large amount of external resistance in the circuit, and to effect the same change in speed in response to the same given movement of the roller 44, the regulator will have to insert a great deal more resistance. The resistance sections $R_2$, $R_3$ and $R_4$ are arranged in the manner shown in Fig. 2 so that when the hand wheel 33 is rotated to vary the resistance sections $R_2$ and $R_3$ for initially adjusting the speed of the drive, the resistance section $R_4$ is simultaneously adjusted. Resistance section $R_4$ is arranged so its ohmic resistance cannot be decreased below a predetermined minimum value, for if it were reduced to zero it is obvious that the resistance of carbon pile 46 would have no effect on the total resistance in the field circuit of motor 14.

When there is a continuous strip passing through the mill, the strip will pass over the roller 44 and if the driving motors of the stand are adjusted so that the strip is placed under tension, it will be obvious that the strip will bear down against the roller 44 and force it downwardly against the restoring force of the spring 47. Initially the spring is so adjusted that when the roller is at approximately the mid position of its vertical travel, the tension of the strip is at exactly the desired value. Since the regulator of the field of the driving motor is arranged so that it is responsive to the position of the tension roller 44, the regulator will vary the excitation of the motor fields so that the motors will maintain the strip under just sufficient tension to keep the roller at the mid-point of its travel.

In operation the apparatus is initially adjusted and the driving motors for the various stands of the mill are started up in the manner previously described in the specification in connection with Fig. 1. As the strip 10 enters the reducing rolls of stand 2, it will not be under tension and the roller 44 will be at the top of its travel. Consequently the motion transmission device will have caused the motion receiving device to operate the lever 56 in a direction to relieve the pressure on the carbon pile so that the resistance of the carbon pile will be at a maximum. Consequently the drive motor for stand 2 will immediately speed up due to the increased resistance in its field circuit, and start to take up the slack in the strip 10 between the stands 1 and 2. As soon as the metal becomes taut enough so that it begins to force the tension roller 44 downwardly, this action is transmitted through the electrical motion transmitting system 48 and will cause the lever arm 56 of the regulator to rotate in a direction to compress the carbon pile resistance 46 and thus decrease its ohmic resistance until a stable condition is reached. If the tension of the strip 10 becomes less than the desired value, the tension roller 44 will rise, operating the regulator to increase the resistance in the field of the driving motor and causing the motor to speed up sufficiently to restore the tension to the desired predetermined value. On the other hand, if the tension becomes too great, the roller 44 will be moved downwardly and in turn actuating the regulator to increase the pressure on the carbon pile thereby decreasing its resistance and causing the motors to slow down slightly thereby to relieve the tension.

In all other respects the operation of the modification of the system shown in Fig. 2 is identical with that described in the specification in connection with the system of Fig. 1.

Although in accordance with the provisions of the patent statutes, I have described the invention as embodied in concrete form, I would have it understood that the apparatus connections shown and described are merely illustrative and that the invention is not necessarily limited thereto since modifications and alterations will readily suggest themselves to persons skilled in the art without departing from the spirit of this invention or from the scope of the annexed claims.

What I claim as new and desire to secure by Letters Patent of the United States is,—

1. In a control system, a plurality of driving motors, means for presetting the speed of one of said motors for a predetermined operating schedule, means for controlling the input of one motor, and means responsive to load on both said motors for rendering said speed presetting means ineffective and said input controlling means effective.

2. A control system comprising a plurality of driving motors, a variable resistance connected in circuit with one of said motors for presetting the operating speed thereof, means for maintaining substantially constant current input to said one motor comprising a regulator having a resistance in circuit with said one motor, and means responsive to load on both said motors for rendering said speed presetting resistance ineffective and said regulating resistance effective.

3. In a control system, for a plurality of load driving motors, means comprising a variable resistance connected in circuit with one of said motors for initially adjusting the speed of one of said motors, means comprising a regulating device for maintaining a substantially constant load on said one motor, and means comprising a load responsive relay for rendering said regulating device effective and a portion of said resistance ineffective.

4. A control system for a plurality of motors comprising a variable resistance connected in the field circuit of one of said motors for initially adjusting the speed thereof, means comprising a regulating device having a pair of vibratory contacts and a resistance connected in said field circuit and controlled by said contacts for maintaining substantially constant load on said motor, and means comprising a plurality of load-responsive relays, one connected with each of said motors for rendering said variable resistance ineffective and said regulating device effective.

5. A control system for a plurality of driving motors, means comprising a variable resistance device connected in the field circuit of one of said motors for initially adjusting the speed of said one motor, regulating means comprising a vibratory contact device and a resistance connected in said field circuit and controlled by said contact device for maintaining substantially constant load on said motor, a contactor having normally-closed contacts for short circuiting said regulating resistance, a second contactor having normally-open contacts connected to a portion of said variable resistance, and means jointly responsive to the load on both of said motors for causing said first-mentioned contactor to open its contacts to render said regulating means effective and for causing said second-mentioned contactor to close its contacts to render said portion of variable resistance ineffective.

6. In a control system, a plurality of driving motors, means comprising a variable resistance connected in the field circuit of one of said motors for initially adjusting the speed thereof to a predetermined operating schedule, regulating means comprising a pair of vibratory contacts controlled in accordance with the load on said one motor and a regulating resistance connected in the field circuit of said motor and controlled by said contacts for maintaining substantially constant load on said motor, a contactor having normally-closed contacts for short circuiting said regulating resistance, a contactor having normally-open contacts connected to said variable resistance, a normally-open energizing circuit for said contactors, means comprising a manually-operated device for partially establishing said circuit, and means comprising a plurality of separate load relays responsive to the load on said motors for jointly controlling the completion of said circuit and the operation of said contactors to render said regulating resistance effective and a portion of said variable resistance ineffective when said motors are loaded and to render said variable resistance effective and said regulating resistance ineffective when the load on one of said motors ceases.

7. In a control system, a plurality of driving motors, a variable resistance connected in the field circuit of one of said motors for initially adjusting the speed of said motor for a predetermined operating schedule, regulating means comprising a device responsive to load on said motor and a second variable resistance connected in the field circuit of said motor and controlled by said load-responsive device for maintaining substantially constant load on said motor, means responsive to load on both said motors for rendering said regulating means effective and means for simultaneously adjusting both of said resistances.

8. In a control system for a plurality of elements operating on a strip of material, a plurality of driving motors each connected to drive one of said elements, a member movable in response to variations in the tension of the strip, a resistance connected in circuit with one of said motors and constructed of a material having an ohmic value variable in response to the pressure applied thereto, means comprising an electric motion transmitting and receiving system responsive to movement of said member for controlling the pressure applied to said resistance, a manually presettable variable resistance connected in circuit with said pressure responsive resistance for initially adjusting the operating speed of said motor and means comprising a relay responsive to load on both of said motors for rendering one of said resistances effective and another of said resistances ineffective.

9. In a control system for a rolling mill and the like having a plurality of sets of rolls operating on a strip of material, a plurality of driving motors each connected to drive one of said sets of rolls, a member movable in response to variations in the tension of the strip, a pressure-responsive resistance connected to one of said motors for controlling the motor so as to maintain the tension of said strip substantially constant, means responsive to load on both said motors for rendering said resistance effective and means comprising an electrical motion transmitting and receiving device responsive to the motion of said member for actuating said resistance.

HARRY A. WINNE.